(12) United States Patent
Blome et al.

(10) Patent No.: US 6,519,497 B1
(45) Date of Patent: Feb. 11, 2003

(54) PROCESS FOR MANUFACTURING CARD-SHAPED DATA CARRIERS

(75) Inventors: Rainer Blome, Paderborn-Elsen (DE); Herbert Grün, Poing (DE); Volker Waschk, Grünwald (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 09/355,913

(22) PCT Filed: Feb. 11, 1998

(86) PCT No.: PCT/EP98/00772

§ 371 (c)(1),
(2), (4) Date: Nov. 22, 1999

(87) PCT Pub. No.: WO98/35316

PCT Pub. Date: Aug. 13, 1998

(30) Foreign Application Priority Data

Feb. 11, 1997 (DE) .......................................... 197 05 170

(51) Int. Cl.[7] .......................... G05B 19/18; G06F 19/00
(52) U.S. Cl. ........................... 700/58; 700/59; 700/114; 700/124; 700/125
(58) Field of Search ........................... 700/56–59, 114, 700/117–119, 122, 124, 125; 283/904

(56) References Cited

U.S. PATENT DOCUMENTS

| | | | | |
|---|---|---|---|---|
| 4,560,426 A | * | 12/1985 | Moraw et al. ................. | 156/64 |
| 5,717,776 A | * | 2/1998 | Watanbe ..................... | 382/116 |
| 5,745,988 A | * | 5/1998 | Hohmann et al. ............ | 29/841 |
| 5,814,796 A | * | 9/1998 | Benson et al. .............. | 235/375 |

FOREIGN PATENT DOCUMENTS

| | | |
|---|---|---|
| EP | 0689164 | 6/1995 |
| JP | 03267744 | 11/1991 |
| JP | 04065295 | 3/1992 |
| JP | 04077298 | 3/1992 |

* cited by examiner

Primary Examiner—Leo Picard
Assistant Examiner—Ryan Jarrett
(74) Attorney, Agent, or Firm—Bacon & Thomas, PLLC

(57) ABSTRACT

The invention relates to a method and apparatus for producing card-shaped data carriers. The method has at least one production step requiring a data carrier of a defined type or quality or in a defined position and/or changing the data carrier in irreversible fashion or in a fashion which can be reversed only by additional expense. The data carrier is optically tested before or after said production step, and the further processing of the data carrier controlled depending on the result of said test.

16 Claims, 5 Drawing Sheets

PROCESS FOR MANUFACTURING CARD-SHAPED DATA CARRIERS

This invention relates to a method for producing card-shaped data carriers and an apparatus for carrying out the method.

Card-shaped data carriers can be formed for example as magnetic stripe cards or chip cards which can be used as check cards, credit cards or electronic purses for carrying out financial transactions, can serve as identity cards for admittance or access control, etc. Such cards are normally made of plastic and/or paper or cardboard. Plastic cards are produced by laminating several layers or by injection molding or other suitable methods, depending on the desired properties and permissible production costs. For the following description a laminated chip card will be used by way of example, whereby the described methods can also be used for differently produced cards and also for different types of card.

Laminated chip cards consist of a plurality of layers: e.g. top protective layer, printed top cover layer, one or more intermediate layers, printed bottom cover layer, bottom protective layer. For producing such cards one produces the individual layers as foils with a certain sheet size. Then one prints the sheets for the top and bottom cover layers. Subsequently one superposes the different sheets and welds them together to a single sheet under pressure and heat. One punches the individual raw card bodies out of this sheet. Endless card production by roll lamination is likewise possible. The individual layers are thereby supplied in the form of long webs to a roll laminating machine, connected to a single web there and then divided into single cards.

Hitherto each single card has been subjected manually to a quality inspection after the abovementioned production steps; i.e. each card is compared manually with a reference card. If the card to be tested is within a given tolerance for given criteria, such as contrast of colors, no burr on the card edges, no scratches, no lint, etc., it is passed on for processing. If the card does not stand the test, which is subjective since performed by a human being, it ends as a reject. The accepted cards are then placed in the magazine of a singler which supplies the cards to a milling machine via a card transport device. With a pocket milling cycle one produces cavities for chip modules to be provided on the cards. Subsequently the chip modules are inserted into the card cavities and fixed in the cavities with an adhesive. This process is called implantation.

This method for producing the cavities has hitherto only been used in chip cards made of sheet material since with integral plastic cards (e.g. made of ABS) produced by injection molding it is easier and cheaper to produce the cavity during injection.

Problems arise from the fact that the abovementioned inspection, being manual, is subjective, time-consuming and involves error, since people are not always as focused as they should be, and thus too many rejected cards pass to final inspection. Further rejected cards arise from the fact that cards arriving at the milling machine in a wrong position are milled wrong. A further problem is that the pocket milling machine must be readjusted for some types of card with respect to the size and shape of the chip module.

The described problems can occur not only during production of the cavities but similarly in each production step in which changes are made on the cards or in production steps in which cards of a certain type are expected or in which the cards must have a defined state or assume a defined spatial position, and a deviation from the expected type/state/position cannot be excluded.

The problem of the invention is therefore to obtain a maximum quality standard and minimize rejects rates at reduced personnel expense in the production of card-shaped data carriers.

This problem is solved by the characterizing features of the invention described in patent claim 1.

According to the invention, optical testing is performed before each production step in which changes are made on the cards or which is critical with respect to the spatial position or type or state of the card.

Said testing can be used especially advantageously for production steps in which the type or state or spatial position of the cards is important. One can thus firstly ensure that the production step is not performed erroneously on cards not intended for this production step. Both can lead to rejected cards and one would lose both the costs for the preceding production steps including the step in question and the material costs incurred.

Secondly, one prevents the production step from being performed on cards which do not fulfill the minimum quality requirements defined for this production step. This avoids e.g. Further production costs being incurred for a rejected card.

The stated variations of the invention can be applied both for single cards and for sheets or webs each having a plurality of cards. The specific manner of testing in each case will be described in the following with reference to some selected embodiments.

The invention will be illustrated by a pocket milling machine used for providing card bodies with cavities for receiving chip modules. The pocket milling machine is extended by an optical detecting unit, which is disposed procedurally before the pocket milling machine according to the invention and connected with a control unit which decides whether to supply the particular card to the milling machine for milling the cavity or whether to supply the milled card to further processing. There are several embodiments of the machine described by the invention. In the following, embodiments will be described in which the optical detecting unit is disposed before the pocket milling machine.

In a first embodiment the abovementioned testing is still performed manually, but not on the individual card but on the sheet, i.e. before punching. This is much faster than checking single cards. A further advantage of checking sheets is that one detects recurrent system errors, e.g. errors produced by a faulty printing roller or scratched laminating plates. The testers check the front and back of the sheet and mark the rejected cards. They mark the cards e.g. with a fluorescent ink or a felt pen or perforate them. The applied markings need not necessarily be in the visible spectral region; one can also use for example a color detectable in the infrared region or an UV-activable substance. Subsequently the cards are punched and stacked. They are then placed in a singler from which the cards are supplied singly to the pocket milling machine via a card transport device, e.g. a conveyer belt, a robot arm with a gripping system or a rotary table. Mounted before or on the pocket milling machine according to the invention is an optical detecting unit which recognizes whether a card is marked. If a fluorescent or UV-active marking is used the card is exposed to UV light. If no marking is present no fluorescent light is reflected. If the card has a fluorescent marking fluorescent light is reflected. This is registered by a detector. One proceeds similarly with markings detectable in the infrared region. If felt pen is used the optical detecting unit is a camera. One can reconstruct the original card position within a sheet, as is necessary for detecting system errors, with reference to the order of the single cards. It is likewise possible to provide the cards with a marking indicating their original position within the sheet. This marking can be for example printed, or molded during laminating by suitable design of the laminating plates. The marking is thereby either designed or disposed, e.g. in the area of the cavity, so as not to disturb the appearance of the card.

A control unit (in the simplest case a relay) connected with the optical detecting unit and with the card transport device and the milling machine decides after the optical testing on the further process of manufacture of the card:

no marking: the normal program is run through, i.e. cards stacked in magazines are inserted into singler, transport to pocket milling machine, milling cavities, further transport to stacking apparatus, stacking, a marking: the normal program is interrupted or altered, i.e. marked cards are supplied to a stacking apparatus for rejected cards before or after the milling machine (in the latter case the milling machine remains turned off).

In this first embodiment, cards arriving in a wrong position (laterally inverted or front and back switched) are not recognized and thus become rejected cards since they are milled at the wrong place. Therefore, no robot arm is used in this first embodiment since it would be too expensive for this embodiment and its spectrum of abilities would not be exploited at all.

Supply to the stacking apparatus is done with a switch in the version with card transport effected by a conveyer belt. In the version with card transport effected by a rotary table it is done e.g. by the rotary table stopping above the rejected card stacking magazine and the corresponding card (which is in a card receiving pocket whose bottom is formed by a further table having a gap at a certain place) falling into the stacking magazine by rotation of the bottom table relative to the rotary table until the gap arrives under the receiving pocket.

In another version the bottom table, which again has a gap, stands still. A card only falls through into the rejects shaft when the rotary table stops at the same position where the bottom table has its gap.

Further possibilities with the use of a rotary table are to blow the cards away from below and supply them to the magazine via a ramp or to suck them pneumatically by a suitable apparatus and then supply them to the rejects magazine. There are surely even more possible embodiments here.

In a second embodiment, manual inspection is fully eliminated. The optical detecting unit no longer consists of a simple detector but of a digital camera connected with a computer. As in the first embodiment of the control unit, the computer must drive the card transport device, the milling machine and the switch. Card production itself remains the same: producing sheets by laminating individual layers, punching out individual cards, manually filling cards into the singler magazine, transport with a card transport device to the pocket milling machine, milling out the cavity for the chip module, transport to a stacking apparatus, manually transport to the implanter, implanting the chip module. The camera, which is installed before the milling machine, in terms of the direction of production, takes a picture of a card. This is done either while a pocket is being milled into the previously conveyed card, i.e. in a standstill phase, or during conveyance, which does not lead to blurred pictures with the speed of exposure of present-day cameras. The computer connected with the camera has stored a reference picture of a sample card. The computer now decides independently on the further process of manufacture of the card. If the card has no scratch, and sharpness, contrast and colors of the layout are within a given tolerance, the card is passed on to milling. If this is not the case, or the card arrives at the camera in the wrong position, e.g. on the back or laterally inverted, the card is directed past the milling process (e.g. via a switch located before or after the milling machine when a conveyer belt is used) and supplied to a stacking apparatus for rejected cards, or it is reversed by an adequate apparatus and supplied to the milling machine in the right position. If the switch follows, the milling machine—driven by. the computer— lets the card pass. Hitherto, rejected cards had to be separated from accepted cards manually after milling. Cards which arrived at the milling machine in the wrong position became rejects through the milling. It is also possible, however, to supply rejected cards and the cards arriving in the wrong position to separate stacking apparatuses by a swiveling, computer-driven switch. This can also be done by connecting two switches in series. Or one uses a switch which can swivel to three outputs (milling machine, rejected card stacking apparatus, cards arriving in the wrong position to be reinserted). Said cards to be reinserted can also be supplied immediately to the milling machine by a suitable card-reversing apparatus. The accepted cards are either stacked and manually brought to the implanter or conveyed to the implanter directly without stacking. There are again different possibilities using a rotary table as a card transport device:

the rotary table stops above the corresponding shaft (rejected cards, cards to be reinserted or reversed) and suitable relative rotation of the bottom table leads to stacking (see above), the cards to be reversed fall onto a reversing apparatus and are resupplied to the rotary table in the right position, or the reversing apparatus is located directly in the rotary table.

The use of a robot arm as a card conveying device is the most expensive but most easily realized solution. The robot arm fetches a card from the provided magazine, places it under the camera, a picture is taken and compared with a reference picture in the computer, the card is reversed, a picture of the back taken and again compared with the corresponding reference picture. Then, the computer causes the arm to take the further steps: conveying on to the milling machine or the stacking device for rejected cards, or turning the card into the right position and conveying it on to the milling machine.

This possibility—photographing the cards from both sides—is the most advantageous embodiment of the invention, since the error rate is lowest and the throughput times are shortest. It can be realized not only with the use of a robot arm but also with the use of a rotary table or band as a card transport device.

Double-sided photography of the card can be effected in three ways:

using two tandem-mounted cameras and two reversing apparatuses (photo-graphing one side of card, transport, reversal, transport, photographing second side of card, transport, possibly repeated reversal with respect to front and back and to lateral transposition, transport to milling machine);

using a camera and a reversing apparatus;

using one camera disposed above and one disposed below the passing cards and a reversing apparatus (which is not used for photography but for turning cards into the right position).

The computer controls the complete procedure: removal of individual card from singler, transport to camera, photography of one side, comparison with reference pictures (front, back), reversal of card, comparison with reference pictures, decision (rejected card, right position), turning card into right position and transport on to milling machine or transport directly to rejects magazine (this being the second version).

Since there are different types of card differing in size, shape and depth profile, it is an advantageous development of the invention if the optical detecting unit recognizes the type of card and requests the corresponding milling program or rejects the card if its type does not correspond to the expected type.

For position detection it is not absolutely necessary to evaluate the total card surface. One can also confine oneself to a section of the card surface. In order to determine the position of the card one defines a section of the printed image of the card surface as a reference. This reference is so defined that the position of the card is clearly derivable therefrom. Thus, a new reference is to be defined for each new layout of the printed image. As an alternative to this procedure one can define a suitable symbol and print it on the card in the area of the later cavity. This symbol could always be the same regardless of the layout of the card surface so that no adaptation is necessary upon a change of layout.

Optical evaluation of the printed image or sections of the printed image can be used not only for position detection but also when a production process handles different types of card and/or different types of module and it is to be ensured that the right type of card and right type of module are brought together. If several types of module are available, they can be distinguished for example by the contact layout or by a manufacturer's identification applied to the module.

The described optical test procedures are not only suitable in connection with production steps performed on single cards. They can also be used in production steps performed on sheets or webs. If the optical testing of a sheet shows that a plurality of cards do not meet the quality requirements, one can consider eliminating the total sheet instead of marking the particular cards and then eliminating said cards. One will normally choose this variant when so many cards are affected that it is more cost-effective to eliminate the total sheet.

In order to test the quality of milling one can dispose an optical testing station after the milling machine, in terms of the direction of card transport. This testing station can test the cavity produced by the milling machine with respect to position, depth and shape. If the test shows insufficient quality of milling, the card can be eliminated as a reject. Moreover, the test result can be used for readjusting the milling machine or causing a readjustment. One can also derive from the test result whether the edge of the milled cavity has a burr, whether the cavity is soiled for example by chips and whether the milling machine is defective and one can expect the same error to be produced continuously if there is no intervention.

Optical testing stations can be used not only in the production of laminated cards but for example also in production by injection molding. The testing station is disposed after the injection molding machine and tests the cards outputted by the injection molding machine. This is recommendable in particular if the cards outputted by the injection molding machine already have a printed image and/or a module.

The invention will be described below with reference to the embodiments shown in the drawings. The invention will be explained first by way of example with reference to the different embodiments of a pocket milling machine and then the inventive principle will be stated in a general form.

Figure 1:
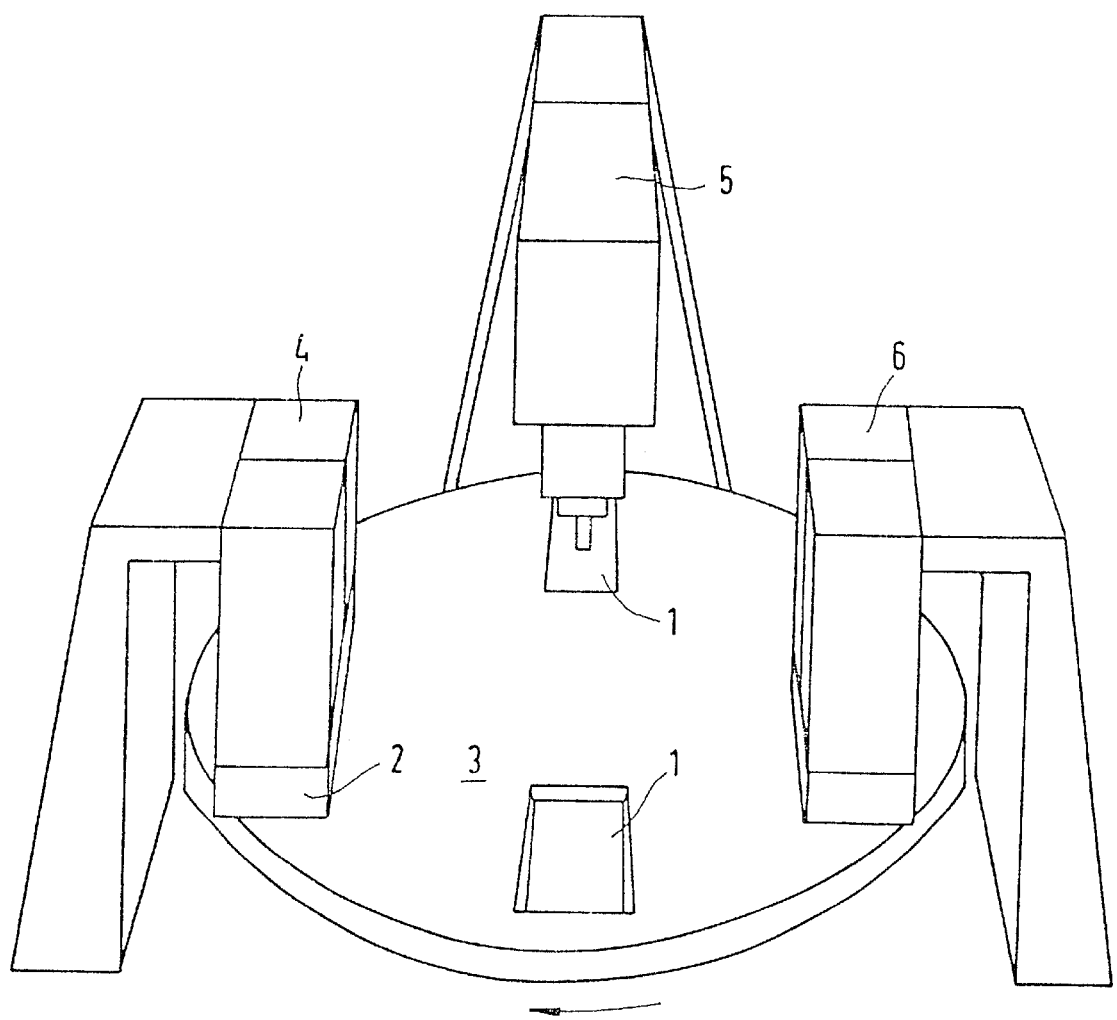
FIG. 1 shows a conventional pocket milling machine.

FIG. 1 shows a conventional pocket milling machine consisting of rotary table 3, chip card receiving pockets 1 worked into the rotary table, singler 2 with magazine 4 mounted thereon, pocket milling machine 5, card stacking magazine 6.

Procedure: Filling cards into magazine 4, singling cards, carrying cards in receiving pockets 1 of rotary table 3, transport to pocket milling machine 5, milling cavities for chip modules, transport to card stacking magazine 6, stacking cards in card stacking magazine 6.

Figure 2:
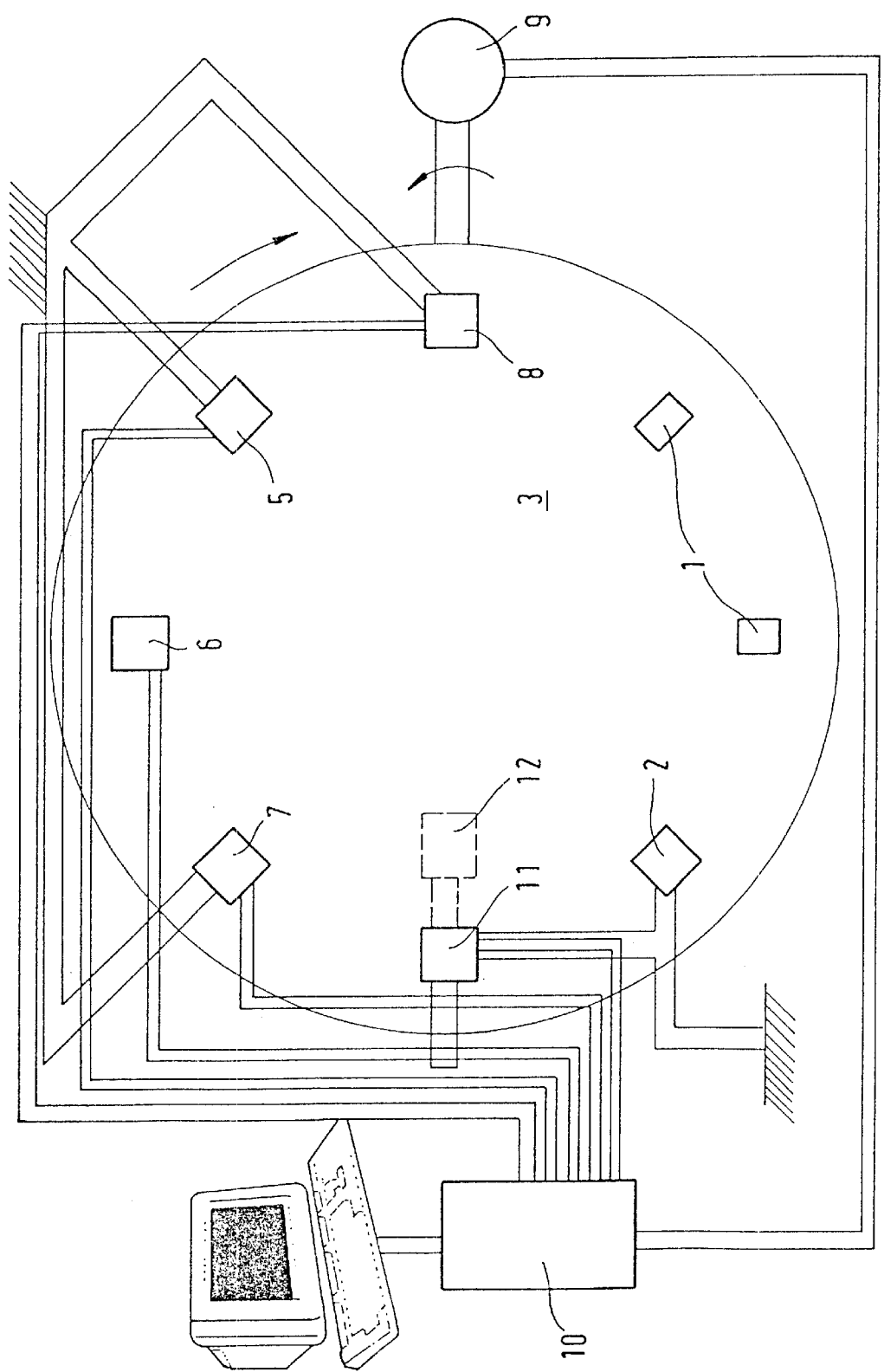
FIGS. 2, 3, 4a and 4b show different embodiments of the inventive pocket milling machine, FIGS. 5a and 5b each show a schematic representation of a production plant for card shaped data carriers to illustrate the principle underlying the invention.

FIG. 2 shows a first embodiment of the inventive pocket milling machine consisting of control unit 10, receiving pockets 1 for chip cards, singler 2, cameras 11 and 12, one mounted above and one below the rotary table, rejected card stacking magazine 7, card reverser 6, pocket milling machine 5, accepted card stacking magazine 8, drive unit 9 for rotary table 3, rotary table 3.

Upper camera 11 is mounted directly opposite lower camera 12 and the bottoms of the receiving pockets for chip cards 1 are transparent.

Procedure: filling cards into magazine of singler 2, singling, transport, taking pictures of front and back of chip cards, transport, stacking rejected cards in rejected card stacking magazine 7, transport, reversal or rotation of cards arriving in the wrong position, transport, milling cavities for chip modules, transport, stacking accepted cards in accepted card stacking magazine 8.

Figure 3:
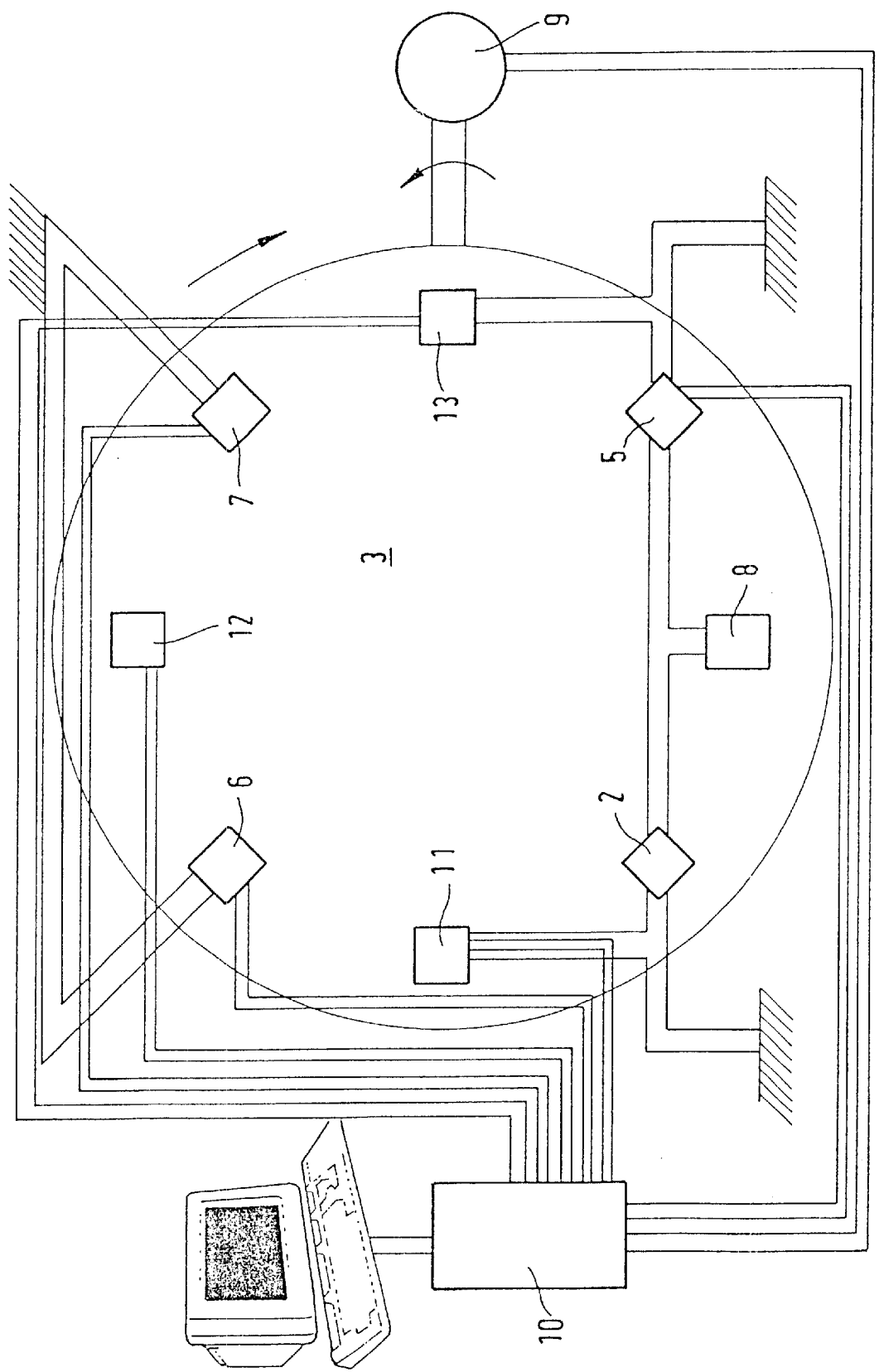

FIG. 3 shows a second embodiment of the inventive pocket milling machine consisting of control unit 10, singler 2, first camera 11, first card reverser 6, second camera 12, rejected card stacking magazine 7, second card reverser 13, pocket milling machine 5, accepted card stacking magazine 8, rotary table 3, drive unit 9 for rotary table 3.

Procedure: Filling cards into magazine of singler 2, singling, transport, taking picture of one side of chip cards, reversing cards, taking picture of other side of chip cards, transport, stacking rejected cards in rejected card stacking magazine 7, transport, reversing or rotating cards arriving in the wrong position, transport, milling cavities for chip modules, transport, stacking accepted cards in accepted card stacking magazine 8.

Figures 4A, 4B:
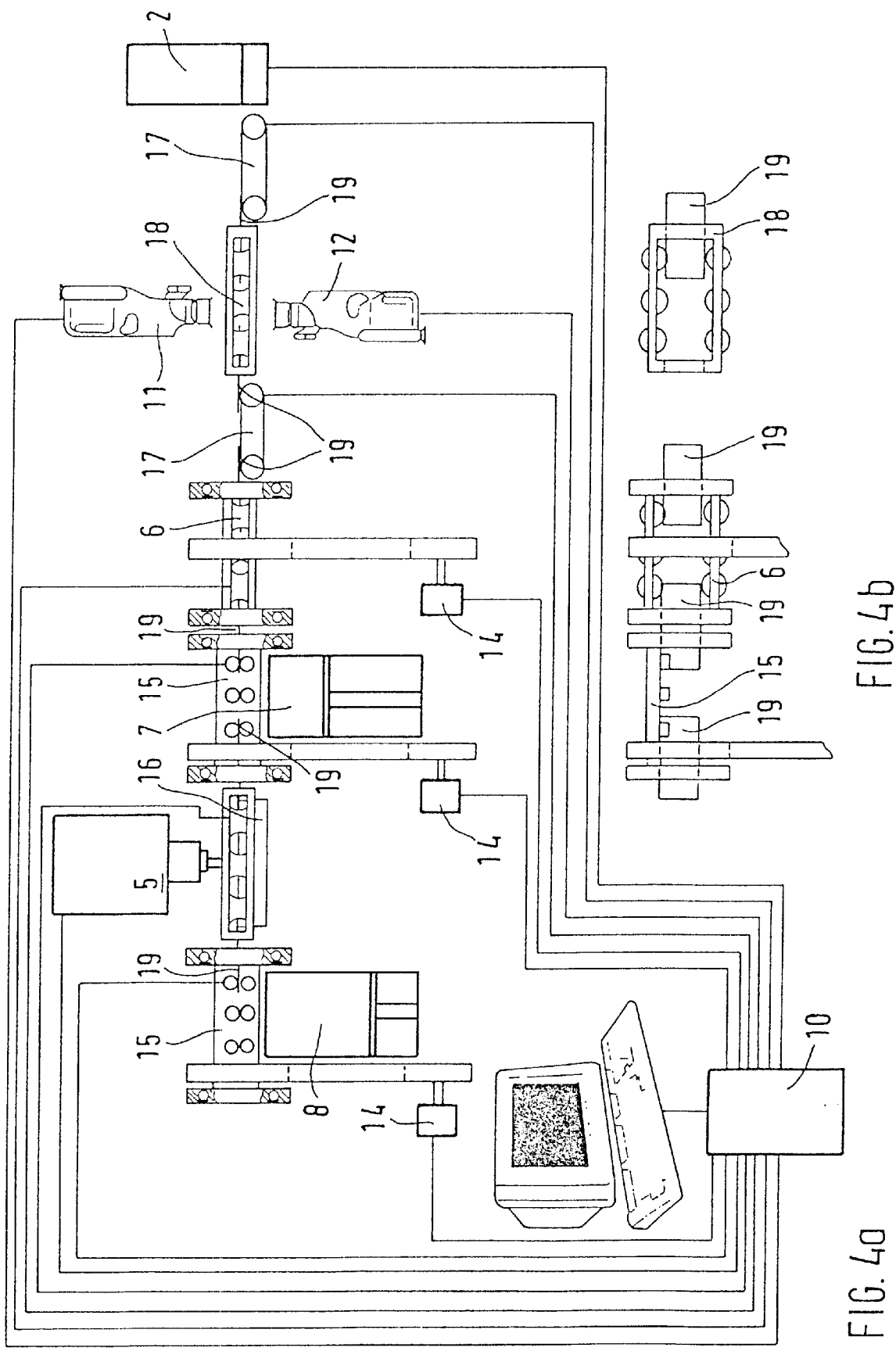

FIG. 4a shows a third embodiment of the inventive pocket milling machine consisting of motors 14 for synchronous belt drives of card reverser 6 and depositing device 15, accepted card stacking magazine 8, card depositing device 15, pocket milling machine 5, milling table 16 with transport device, rejected card stacking magazine 7, card reverser 6, transport band 17, cameras 11 and 12, transport device 18 permitting viewing of the total card surface from above and below, transport band 17, singler 2 with magazine, control unit 10, chip cards 19.

FIG. 4b shows a plan view of a detail of FIG. 4a showing card depositing device 15, card reverser 6 and transport device 18 permitting viewing of cards 19 from above and below.

Procedure: Filling cards 19 into magazine of singler 2, singling, transport, taking pictures of both sides of cards 19, reversing cards 19 arriving in the wrong position, transport, stacking rejected cards using card depositing device 15 in rejected card stacking magazine 7, transport, milling cavities for chip modules, transport, stacking accepted cards using card depositing device 15 in accepted card stacking magazine 8.

Figure 5A:
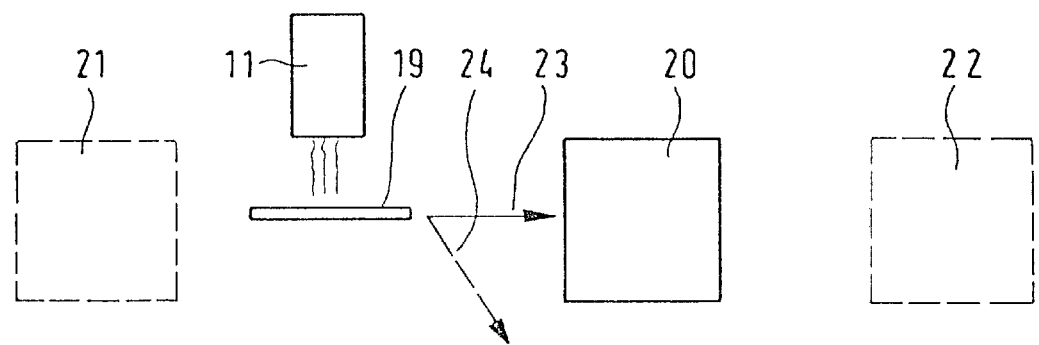
Figure 5B:
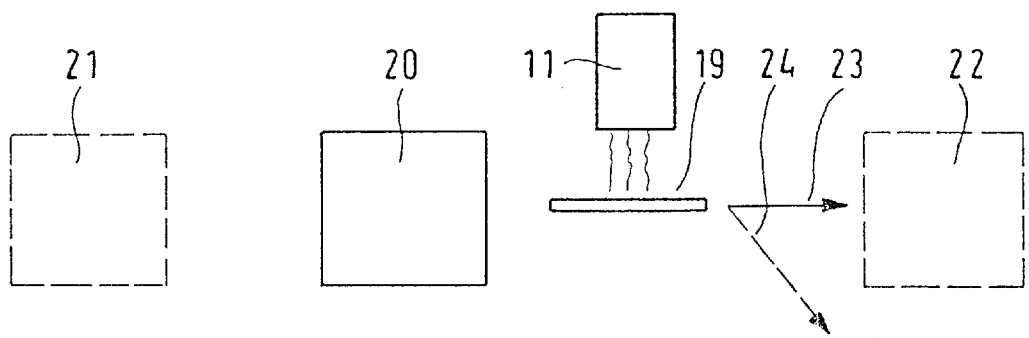

FIGS. 5a and 5b show schematic representations of a production plant for card-shaped data carriers to illustrate the principle underlying the invention.

FIG. 5a shows the first variant of the invention in which optical testing of card 19 is effected before the production step. The production step in question is done in processing station 20. Dashed blocks 21 and 22 are intended to illustrate that card 19 can run through further processing stations before and after processing station 20. The transport direction of card 19 is shown by arrow 23. Disposed before processing station 20, in terms of said transport direction, is optical testing station 11, for example in the form of a camera. Optical testing station 11 performs an optical test on card 19, testing for example the position of card 19, the type of card or its quality. Depending on the result of the test, card 19 is either supplied to processing station 20 (arrow 23) or eliminated (arrow 24). If eliminated card 19 is still usable it can be resupplied to the production process at a different place. If optical testing relates to the position of card 19, testing station 11 is to be disposed such that an undesirable change of position of card 19 can be excluded between testing station 11 and production station 20. Testing of the position of card 19 is always only necessary if an undesirable change of position is possible since the last place where the position of card 19 was definitely known. A possible procedure for determining the position of the card by measurement technology will be explained with reference to FIG. 6.

FIG. 5b shows a production plant in which the optical testing of card 19 is effected after the production step. FIG. 5b largely matches FIG. 5a, differing only in that optical testing station 11 is disposed after processing station 20, in terms of the transport direction of card 19, thus permitting performance monitoring of the production step or steps conducted in processing station 20.

In a production plant for cards, all processing stations can in principle be equipped with an optical testing station before and/or after the processing station. It is especially commendable to use for all processing stations an optical testing station which makes a change on the card which is irreversible or only reversible at additional expense.

By disposing the testing station before the processing station one prevents rejects being produced, e.g. during milling of the cavity, because of a wrong position of the card or a wrong type of card. One can likewise prevent a rejected card being processed farther and the damage increased, e.g. by the mounting of further components such as a chip module.

By disposing the testing station after the processing station one can subject the processing station to permanent quality inspection, or inspection can be done in case of need by temporarily activating the testing station.

Figure 6:
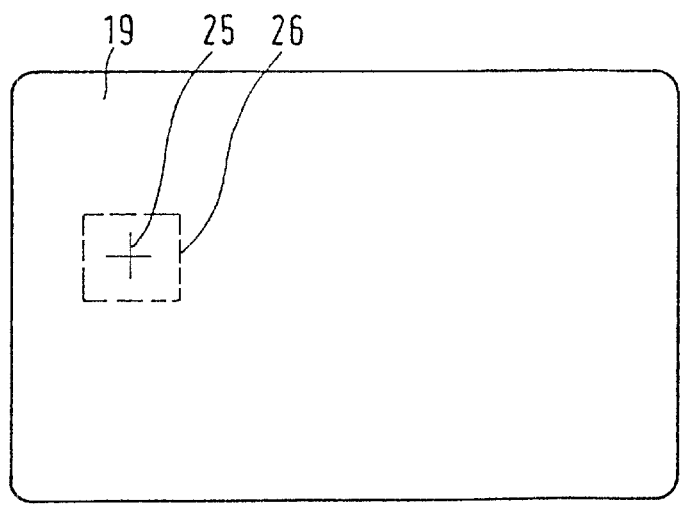
FIG. 6 shows a card marked for position testing.

FIG. 6 shows card 19 provided with marking 25 by means of which the proper positioning of card 19 can be tested. Marking 25 has the form of a hairline cross and is disposed in area 26 of the cavity so as not to impair the optical appearance of card 19. Marking 25 can be provided both on a card in which the cavity is not yet milled or is produced in another way, and on a card already having a cavity. In the latter case marking 25 is applied to the bottom of the cavity. By the optical testing station ascertaining whether marking 25 is present (one-sided testing station) or on which side of the card the marking is disposed (two-sided testing station) one can determine whether the card is properly positioned with respect to front and back. Since marking 25 is applied outside the bisecting lines of card 19 one can additionally ascertain whether card 19 is turned round. Depending on the test result card 19 can be eliminated or a reversing device can be provided for bringing card 19 into the desired position.

Besides the abovementioned applications, the optical testing station can also be designed to be able to test the position and/or structure of embossings or characteristic printed image elements on the card. Further, it is possible to test the card material, for example with the aid of an infrared or UV detector, for certain properties, in particular material properties which are used for later authenticity testing. In cards in which a module and/or antenna or other components are integrated into the card body, it is possible to test the position of the components in transmitted light or with the aid of infrared light and also ascertain for example an overlap with the area of the cavity or other relevant card elements, such as an embossed area, lasered area, etc.

Optical testing of the sheet or of webs from which the cards are later produced can be effected both on one side and on both sides. Depending on the kind of test, one requires whole-area inspection or only partial inspection, for example of a selected strip or web. In addition, the optical testing station can also be provided for detecting identifications applied to the sheet or webs and passing them on to the process control for farther evaluation, or applying identifications (e.g. detected quality assurance data) to the sheets with a printer (ink jet, etc.) for later processing of the data. Moreover, the surface quality of the sheets or webs can be tested by suitable measurements of angle of reflection or glancing angle. One can likewise determine the sheet or web thickness, and perform different tests with respect to flatness, waviness, deformation and edge quality.

The optical testing station can also be designed to be able to test special prints, such as fluorescent prints, prints with optically variable inks, iriodine prints, etc. Furthermore, it is possible to test not only the position of applied chip modules but also the positioning of any desired components, such as magnetic stripes, signature stripes and hologram or diffraction structure elements or lens screen structures.

Altogether one can say that all optical tests necessary for producing card-shaped data carriers can be performed on the basis of the above invention. According to the invention these tests are assigned to the corresponding production steps depending on their necessity, thereby obtaining fully automatic control of production so that rejects rates can be reduced to a minimum while machines can simultaneously be optimally utilized.

What is claimed is:

1. A method of inspecting card-shaped data carriers, at least one predetermined inspection criteria being required of said data carriers, said data carriers being capable of modification to meet said at least one predetermined inspection criteria, said method comprising the steps of:

delivering at least one of said data carriers to an optical testing station;

performing a test on said data carrier at said optical testing station, said test determining whether said data carrier meets said at least one predetermined inspection criteria; and determining whether to remove said data carrier from further processing or forward said data carrier for continued processing on the basis of the test performed on said data carrier, wherein a printed image applied on said data carrier prior to delivery to said optical testing station is used as a reference to determine a position of said data carrier at said optical testing station.

2. The method according to claim 1 wherein said optical testing station tests each data carrier singly.

3. The method according to claim 1 wherein a plurality of data carriers are disposed in a web, said web being delivered to said optical testing station for examination.

4. The method according to claim 1 wherein said test includes examination of the data carrier position, said data carrier passing through said optical testing station and being forwarded for further processing upon detection of a predetermined position of said data carrier relative to said printed image.

5. The method according to claim 1 wherein the data carrier is supplied to a reversing device and positioned therewith into a predetermined position relative to said printed image when said optical testing station detects said data carrier as failing to be positioned in said predetermined position.

6. The method according to claim 1 wherein said optical testing station removes said data carrier from further processing upon a determination of said data carrier as failing to be positioned in a predetermined position.

7. The method according to claim 1 wherein said data carrier position is tested in reference to a marking applied thereon.

8. The method according to claim 1 wherein the optical testing station recognizes a predetermined type of data carrier, said optical testing station commanding a corresponding milling program to be performed on said data carrier upon a determination that said data carrier is of said recognized type of data carrier, said optical testing station removing said data carrier from further processing upon a determination that said data carrier fails to be recognized as said recognized type of data carrier.

9. The method according to claim 1 further comprising the step of determining whether the result of said test satisfies predetermined minimum quality requirements from production steps prior to inspecting said data carriers.

10. An apparatus for producing card-shaped data carriers including a plurality of processing stations, at least one predetermined inspection criteria being required of said data carriers, said data carriers being capable of modification to meet said at least one predetermined inspection criteria, said apparatus comprising:

at least one optical testing station configured to perform a test on said data carriers, said optical testing station positioned along a transport path of said data carriers among said processing stations;

at least one transport device arranged to transport said data carriers along said transport path and through said optical testing station; and a control unit arranged to control further processing of said data carriers along said transport path upon receipt of a result from the test on said data carriers at said optical testing station, said test determining whether said data carriers meet said at least one predetermined inspection criteria;

wherein a printed image applied on said data carrier prior to delivery to said optical testing station is used as a reference to determine a position of said data carrier at said optical testing station.

11. The apparatus according to claim 10 further including at least one reversing device configured to position said data carrier into a predetermined position when said optical testing station detects said data carrier as failing to be positioned in said predetermined position.

12. The apparatus according to claim 10 wherein said optical testing station includes a UV light source and a detector sensitive to florescent light.

13. The apparatus according to claim 10 wherein said optical testing station includes a camera.

14. The apparatus according to claim 10 wherein said optical testing station includes two cameras each positioned along a surface of said data carrier parallel to said transport path.

15. The apparatus according to claim 10 wherein one of said processing stations is a milling machine.

16. The apparatus according to claim 10 wherein one of said processing stations is an implanter.

* * * * *